Aug. 28, 1934.   V. H. THOMAS   1,972,049
METHOD FOR THE ERECTION OF AERIAL TRANSMISSION LINES
Filed June 26, 1931   2 Sheets-Sheet 1
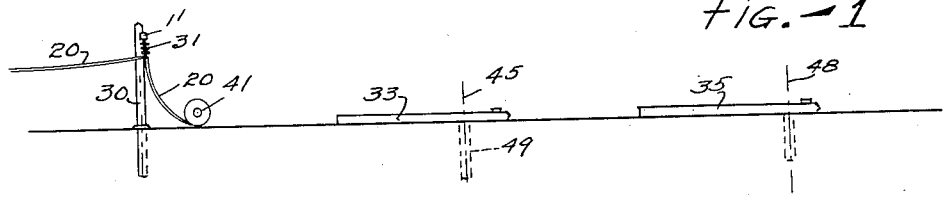
FIG.-1
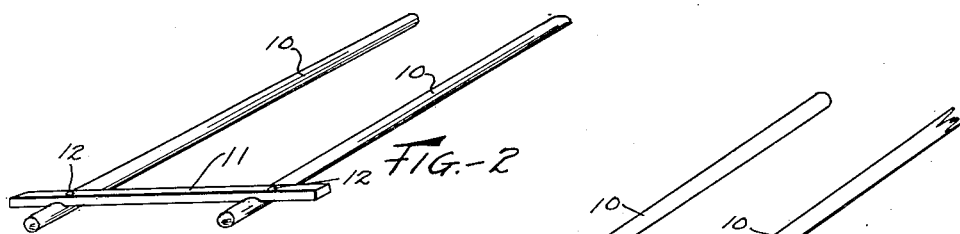
FIG.-2
FIG.-3
FIG.-4
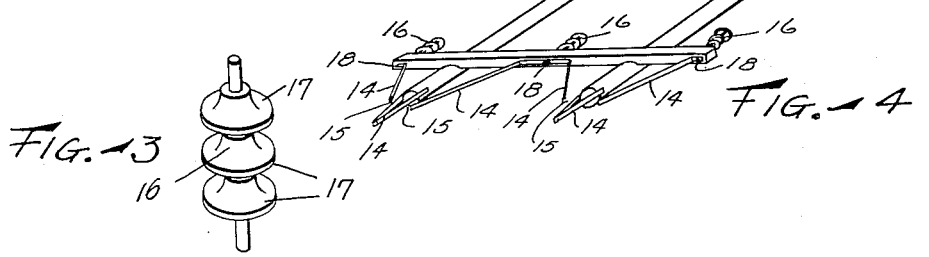
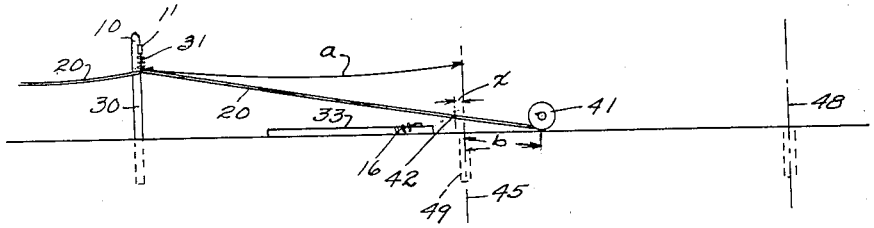
FIG.-5
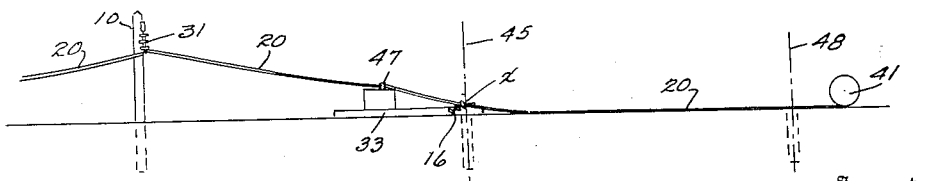
FIG.-6
Inventor
VERNON H. THOMAS
By Frank D. Gray
Attorney Aug. 28, 1934.  V. H. THOMAS  1,972,049
METHOD FOR THE ERECTION OF AERIAL TRANSMISSION LINES
Filed June 26, 1931  2 Sheets-Sheet 2
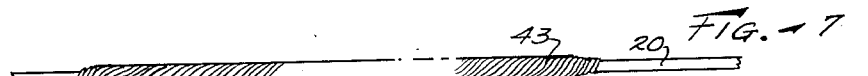
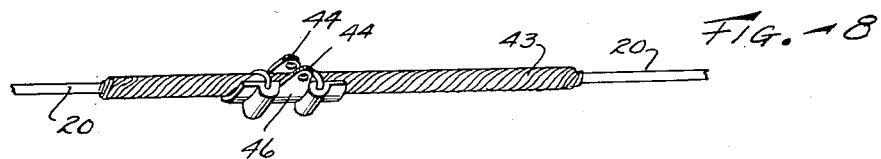
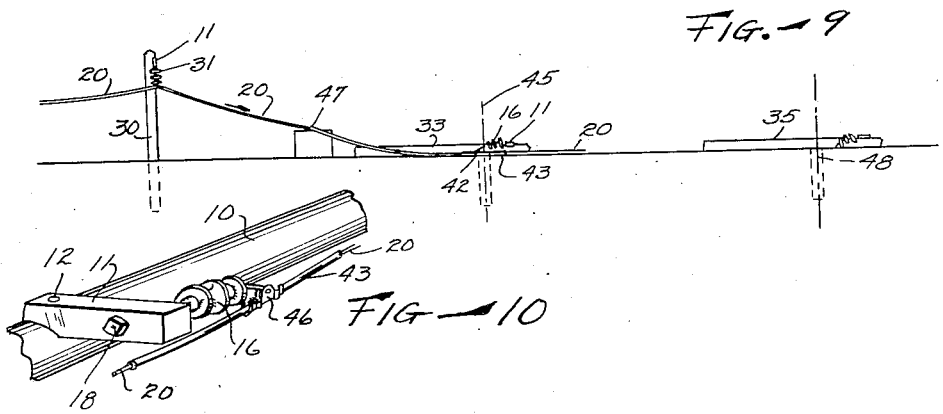
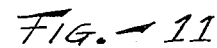
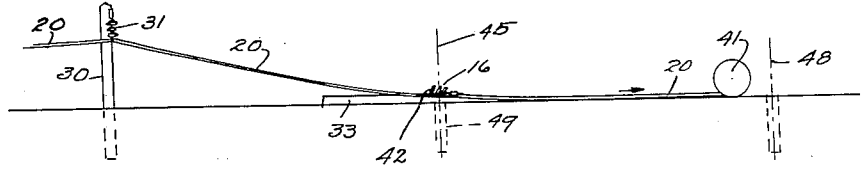
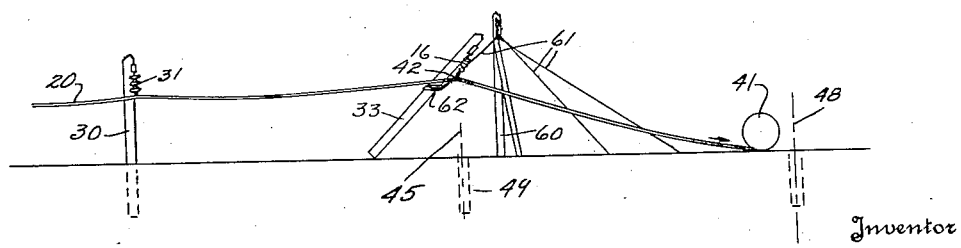
Inventor
VERNON H. THOMAS
By Frank D. Gray
Attorney Patented Aug. 28, 1934

1,972,049

UNITED STATES PATENT OFFICE 1,972,049

METHOD FOR THE ERECTION OF AERIAL TRANSMISSION LINES

Vernon H. Thomas, Dallas, Tex.

Application June 26, 1931, Serial No. 547,168

4 Claims. (Cl. 175—376)

This invention relates to a method for the erection of overhead transmission or distributing lines and the like, and is especially directed to the erection of overhead power lines such as are used to distribute electrical energy.

Heretofore, in the erection of such power lines, the general practice has been to first erect the poles and then attach the cross arms, bayonets and insulators to such previously erected poles. The next step was to string the conductor wires. These wires or conductors were, in the past, strung out on the ground, then pulled up into position on the cross arms and tensioned, after which they were secured to the insulators, which had been previously attached to the erected poles. Very rarely the wires or conductors were tensioned on the ground and then drawn up and secured to the previously erected insulators, but in most instances the conductors were tensioned after they had been pulled up to the cross arms and then attached to the insulators on the previously erected poles.

Such methods, as have just been outlined, require the performance of considerable work by workmen on the erected poles. After the pole has been erected the workmen must climb the pole or tower and bolt or otherwise secure, to the upper portion of such pole, the cross arms, braces, bayonets and insulators. Likewise when the conductors or wires were being strung, the workmen again had to climb the poles to aid in the tensioning of the wires and secure them to the insulators. While workmen become used to working at such heights and proficient in the handling of tools while supported by the usual linemans spurs and belt, some distance above the ground, they could nevertheless accomplish more if they did not have to leave the ground. Likewise the workmanship would be of a higher quality and could be accomplished with considerable less danger of accident to the workmen if such power lines were erected in a manner as to make it unnecessary for workmen to leave the ground.

The erection of power transmission lines, especially the heavy lines used to transmit high voltage electric power, by the methods used in the past is comparatively slow and tedious work, due to the fact that the greater part of the labor must be performed by workmen some distance from the ground, adjacent the top of the pole where they work under the most disadvantageous conditions and are at all times in precarious positions, risking injury, as the slightest misstep, if it may be called such, usually causes the workman to fall, which generally results in serious injury.

The general object of this invention, therefore is to provide a method of erecting overhead transmission lines in a manner such as to greatly increase the speed of the erection and decrease the dangers of injury to the workmen during the erection operations.

A more specific object of the invention is to provide a method for the erection of overhead transmission lines in a manner such as will eliminate the necessity for workmen leaving the ground.

Another object of this invention is to provide a method of erecting overhead transmission or power lines and the like, in a manner to permit the assembly of the various parts by workmen without necessitating their leaving the ground, thereby greatly improving the workmanship, lessening the time required for the erection of such power lines, and therefore decreasing the cost of such erection resulting in a great economic saving to those interested in the erection of such overhead transmission lines.

Other objects of this invention will become apparent from the following description, reference being had to the accompanying drawings illustrating a preferred manner of carrying out my invention, and the essential and novel characteristics thereof will be set forth in the claims.

Referring to the drawings, which diagrammatically illustrate the preferred steps used to carry out this improved method for the erection of power transmission lines and the like;

Figure 1 illustrates the first step of the method;

Figure 2 is a perspective of an H-frame or pole which may be used to support the transmission conductors or lines;

Figure 3 is a perspective of one type of insulator;

Figure 4 is a perspective of the H-frame, with insulators, cross arms, and lightning arrestors attached thereto;

Figures 5 and 6 diagrammatically illustrate succeeding steps of the method;

Figure 7 illustrates one form of conductor armor;

Figure 8 illustrates a suspension clamp attached to the conductor;

Figure 9 illustrates a following step in the operations;

Figure 10 is a fragmentary perspective of a portion of the H-frame, the cross arm, insulator and conductor being attached thereto;

Figures 11 and 12 are diagrams illustrating the last steps of my improved method.

This improved method, contemplates a complete sequence of operations by means of which aerial or overhead transmission lines may be erected by workmen on the ground, and contemplates so arranging these steps, that the various parts required for the transmission line and its supporting structure may be completely assembled and tensioned on the ground, and thereafter raised to a position above the ground and the supporting structures secured thereto without altering the tension of the transmission conductors or wires.

As shown in Figs. 1 to 4 inclusive the first step in the improved method comprises assembling on the ground, the H-frame or supporting structure 10. The H-frame comprises a pair of spaced poles some fifty or sixty feet in length which are joined at the upper end by a suitable cross arm or horizontally extending beam 11, secured in place by means of suitable bolts 12. The bayonets 14 which comprise structural iron members so arranged as to provide lightning protective gaps 15, are then secured in place on the cross arms and upper ends of the pole. The electric insulators 16 such as the one generally indicated in Fig. 3, usually comprise porcelain cups or discs 17, the upper one of which is secured to the cross arm by suitable bolts 18 and the lower one is adapted to support the conductor or wire 20.

While a specific type of supporting structure has been described, nevertheless it is contemplated that other structures such as single poles or structural towers could be used equally as well. The H-frames or supporting structures on which the cross arms and insulators have been assembled are laid on the ground along the course of the proposed power line, spaced apart at certain predetermined distances. It is understood, that the course of the proposed line has been surveyed and the positions of the supporting structures or H-frames have been marked by suitable holes or foundations. For ease of description we will assume that the frame 30 in Figs. 1, 5, 6, 9, 11 and 12 has been previously erected by this improved method and the method of erection will be described from that point on.

A cable or conductor 20 has been stretched in place and secured to the insulator 31 on the frame 30. The cable 20 is a substantially continuous wire, or the type usually used for such power transmission lines, and is capable of conducting electrical energy. The cable or wire 20 is generally stored on a suitable reel or spool 41 which may be transported from place to place in any well known manner. After the supporting structures have been laid on the ground the next operation is the stringing and tensioning of the conductor. The spool 41 is unreeled until the cable is beyond the position of the stake or mark which indicates the erected position of the H-frame 33. The cable 20 is then pulled or drawn taut until it has been placed under such tension as is required for the cable between each supporting structure. A mark 42 is made on the cable or conductor, a predetermined distance from the foundation bolts or stakes which mark the point of erection of the H-frame 33. The mark indicates the point at which the conductor armor 43 and supporting clamps illustrated in Figs. 7 and 8) are attached.

Figure 5 diagrammatically indicates a manner of locating the mark 42 by the use of a compensating measurement. As heretofore mentioned, the supporting structures are in most cases, spaced equidistant from each other, therefore the length of conductor or wire required between these supporting structures is the same in most instances. Such length is readily computed and is represented by the line "$a$" in Fig. 5. This represents the length of a properly tensioned wire from the insulator 31 to the position of the insulator on the next succeeding supporting structure, when erected.

For convenience the cable 20 is unreeled a predetermined distance beyond the location mark 45 for the supporting structure 33, and is drawn up to the required or predetermined tension. The length of the cable 20, from the insulator 31 to the reel 41 is then readily computed, (the height of the insulator 31 from the ground being known). Then the distance "$a$" is subtracted from such length, the result being indicated by the line "$b$". For convenience, the distance from the reel to the point 45 is subtracted from the distance "$b$" and the result is the compensating measurement "$x$". Hence the workmen need only measure back from the point 45, the distance "$x$" towards the supporting structure 30 and mark the wire or cable 20.

After the cable 20 is marked it is snubbed or gripped, intermediate the supporting structure 30 and the mark or stake 45, as indicated at 47 on Fig. 6. This maintains the cable taut at the supporting structure 30 and permits it to be slacked or released from the tensioning device. The reel 41 is then unwound carrying the cable the distance "$b$" beyond the location point 48 for the next succeeding supporting structure 35. As the cable is slack the protecting armor 43 is readily wrapped around the cable 20 for some distance to either side of the mark 42. The clamp 46 is then fastened to the cable in a position where the ears 44 of the clamp, to which the insulator 16 is secured, are directly adjacent the mark 42 on the cable 20. The clamp 46 is then secured to its respective insulator 16.

After the cable 20 has been secured to the insulator 16 of the supporting structure 33, the tension is again applied to the cable 20 at the reel 42. Any well known means may be used to tension the cable, for example a block and tackle. The cable is then released from the snubbing mechanism 47 and the supporting structure 33 is ready to be raised into position.

The supporting structure 33 is next raised into position and secured in a previously dug hole 49 or on suitable foundation bolts on the previously constructed pier. The supporting structure 33 may be raised by a suitable crane or, as illustrated in Fig. 12, by a gin pole 60 provided with suitable block and tackle 61. A sling 62 is attached to the supporting structure in such a manner that it will fall to the ground when the tension thereon is released. This sling is in turn grasped by a hook associated with the block and tackle arrangement and the supporting structure 33 is raised until its lower end is seated in the previously dug hole 49 or set on suitable foundation bolts. The supporting structure 33 is then secured in place and the same operation followed for the erection of each succeeding supporting structure.

The method has been described as including an intermittent snubbing, releasing and retentioning of the conductor 20. It is nevertheless contemplated that the reel 41 be so manipulated as to maintain the tension on the conductor 20 at all times. However in some instances, such as where the conductors are of considerable weight it is found advantageous to intermittently snub and release them.

From the foregoing description it is evident that this improved method for the erection of power transmission lines, and the like, permits the entire structure to be assembled on the ground and thereafter raised into place without necessitating the climbing of the erected supporting structure by workmen, at any stage during assembly or erection, thereby greatly improving the quality of the workmanship, decreasing the danger of injury to workmen and reducing the time required for the erection of such transmission lines, all of which combine to minimize the expense of erecting such transmission lines.

Having set forth the principles of my invention, and described and illustrated an embodiment thereof for practical use, what I claim and desire to secure by Letters Patent, is,—

1. The method of erecting overhead transmission lines comprising the forming in a substantially horizontal position of suitable supporting structures, attaching insulators to such structures while in such position, attaching a conductor to such insulators and tensioning the conductor and subsequently swinging the supporting structures to a vertical position while maintaining the conductor in tension.

2. The method of erecting overhead transmission lines comprising forming in a substantially horizontal position of supporting structures including rigid members, securing insulators to said members while such structures are in said position, securing conductors to the insulators, placing the conductors under tension while the said structures are in horizontal position and subsequently raising the arms, insulators and conductors as a unit while maintaining the conductor under tension.

3. The method of erecting overhead transmission lines comprising, locating the position of succeeding supporting structures, assembling a supporting structure on the ground attaching an insulator to such structure, securing a conductor to such insulator, tensioning the conductor subsequently erecting the supporting structure, with its attached insulator unreeling the conductor to a point beyond the location for the next succeeding supporting structure, assembling such last named structure including insulators on the ground, attaching the last named insulators to a predetermined point on the conductor, and subsequently erecting the last named supporting structure at a predetermined distance between the structures and a predetermined tension on the conductor.

4. The method of erecting overhead transmission lines comprising, locating the position of succeeding supporting structures, assembling a structure on the ground attaching an insulator to such structure, securing a conductor to such insulator, tensioning the conductor, subsequently erecting the supporting structure while maintaining the conductor in tension, snubbing the conductor to maintain it in tension at such supporting structure, extending the conductor to a point beyond the location for the next succeeding supporting structure, assembling such structure including insulators on the ground, attaching the last named insulators to a predetermined point on the conductor, placing the conductor in tension at a point beyond the second named insulator, relieving the snubbing, and subsequently erecting the last named supporting structure while maintaning the conductor in tension.

VERNON H. THOMAS.